United States Patent
Saunders

(10) Patent No.: US 11,550,622 B2
(45) Date of Patent: Jan. 10, 2023

(54) TASK ALLOCATION FOR VEHICLES

(71) Applicant: Aurora Flight Sciences Corporation, Manassas, VA (US)

(72) Inventor: Jeffery Saunders, Cambridge, MA (US)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 448 days.

(21) Appl. No.: 16/704,326

(22) Filed: Dec. 5, 2019

(65) Prior Publication Data
US 2021/0173700 A1  Jun. 10, 2021

(51) Int. Cl.
*G06F 16/245* (2019.01)
*G06F 9/48* (2006.01)
*G05D 1/10* (2006.01)
*B64C 39/02* (2006.01)
*G05D 1/00* (2006.01)

(52) U.S. Cl.
CPC .......... *G06F 9/4881* (2013.01); *B64C 39/024* (2013.01); *G05D 1/104* (2013.01); *G06F 16/245* (2019.01); *B64C 2201/021* (2013.01); *B64C 2201/141* (2013.01); *G05D 1/0088* (2013.01)

(58) Field of Classification Search
CPC ... G06F 9/4881; G06F 16/245; B64C 39/024; B64C 2201/021; B64C 2201/141; G05D 1/104; G05D 1/0088
See application file for complete search history.

(56) References Cited

U.S. PATENT DOCUMENTS

2014/0074339 A1* 3/2014 Casado ............... G05D 1/00 701/24
2019/0324456 A1* 10/2019 Ryan ................. B64C 13/18

OTHER PUBLICATIONS

Ad Hoc Network-Based Task Allocation With Resource-Aware Cost Generation for Multirobot Systems; IEEE Transactions on Industrial Electronics, vol. 61, No. 12, Dec. 2014; Dong-Hyun Lee, Sheir Afgen Zaheer, and Jong-Hwan Kim (Year: 2014).*
Market-Based Multirobot Coordination: A Surveyand Analysis; Proceedings of the IEEE, vol. 94, No. 7, Jul. 2006 M. Bernardine Dias, Robert Zlot, Nidhi Kalra, and Anthony Stentz (Year: 2006).*
Distributed Sequential Auctions for Multiple UAV Task Allocation; Proceedings of the 2007 American Control Conference; Marriott Marquis Hotel at Times Square; New York City, USA, Jul. 11-13, 2007; P.B. Sujit and Randy Beard (Year: 2007).*

* cited by examiner

*Primary Examiner* — Anne Marie Antonucci
*Assistant Examiner* — Jared C Bean
(74) *Attorney, Agent, or Firm* — Coats & Bennett, PLLC

(57) ABSTRACT

Methods and apparatus are provided for allocating tasks to be performed by one or more autonomous vehicles to achieve a mission objective. Generally, a task allocation system identifies a final task associated with a given mission objective, identifies predecessor tasks necessary to complete the final task, generates one or more candidate tasks sequences to accomplish the mission objective, generates a task allocation tree based on the candidate task sequences, and searches the task allocation tree to find a task allocation plan that meets a predetermined selection criteria (e.g., lowest cost). Based on the task allocation plan, the task allocation system determines a task execution plan and generates control data for controlling one or more autonomous vehicles to complete the task execution plan.

20 Claims, 11 Drawing Sheets

TASK ALLOCATION FOR VEHICLES

TECHNICAL FIELD

The present disclosure relates generally to the operation of vehicles (e.g., autonomous vehicles) and, more particularly, to methods and apparatus for determining a sequence of tasks to be performed by a vehicle.

BACKGROUND

Task allocation is the process of assigning tasks to agents, where an agent is an independent entity (such as an autonomous vehicle) capable of executing one or more of the tasks. Task allocation can occur in a centralized processor configured to remotely operate the independent entities or can also occur through processors local to each independent entity.

The simplest example scenario to which task allocation is useful is the traveling salesman problem. A traveling salesman needs to visit x cities while minimizing the distance traveled. The order of cities visited determines the overall distance traveled. This is a combinatorial problem, NP-complete. Other exemplary scenarios can be search and rescue operations by a single vehicle or fleet of vehicles, and pick-up and drop-offs for passengers. Generally, the processing time to find the optimal solution using known methods is not practical (typically years, though simple scenarios can be reasonable). Task allocation algorithms find solutions without looking at all possible combinations. The solutions may not always be optimal but can be found in reasonable time.

The most common algorithms used in task allocation are the genetic algorithm, mixed integer linear programming, constrained gradient descent algorithms, and branch and bound. The genetic algorithm encodes the assignments of tasks into a chromosome similar to a chromosome in cellular biology. The algorithm generates a set of random mutations into the chromosome to modify the task assignments, creates a set of children and evaluates the children. Children with the lowest cost are kept, and the rest are removed. "Cost" is defined as a general cost and/or constraint in resources to achieve a certain task. e.g., time to complete, distance to target, vehicle's survivability, risk minimization, efficiency, fuel, and constraints such as, vehicle status (altitude, speed, etc.), operational/capability limitations (turn radius, max climb rate, max altitude, max speed, etc.), sensor operational limitation (visibility, resolution, scan rate, etc.), and environmental constraints (e.g., weather condition, time of day, lights, terrain condition, DVE factors, no-fly zone, limited airspace, etc. or even an actual financial cost in achieving the task).

The genetic algorithm repeats the mutation process through many generations. After a preset number (another example of an allotted limitation/constraint) of generations are created, or some other criteria is met (e.g., cost not improving, best set of parameters not changing, etc.), the algorithm choses the chromosome with the lowest cost, and hence the task assignments with the lowest cost. A genetic algorithm is a relatively simple algorithm to implement, but is difficult to refine to good performance and can have large processing times to find feasible or good solutions. Further, there is no guarantee of finding the optimal solution.

Mixed integer linear programming sets up the discrete assignment choices into continuous choices with a cost function. Modeled as such, the search space becomes a constrained optimization problem in a continuous space. These types of problems are well understood and many commercial products exist to solve these problems. This method suffers from discrete choices being modeled as continuous variables, which do not always map back from continuous to discrete. Mixed integer linear programming can also have long computation times.

Gradient descent algorithms are similar to mixed integer linear programming, but the cost and constraints no longer need to be linear, but the computation time can increase in non-linear cases.

Branch and bound is a method of organizing task assignments into a tree structure. The branch and bound approach performs a greedy search to quickly find a feasible solution, uses the cost of the feasible solution to prune the tree, and then searches the remaining sections of the tree for a better solution. As better solutions are found, the tree can be further pruned. While exhaustively searching the tree is still not practical, quickly finding a solution at the beginning is very useful. This approach guarantees of finding the optimal solution, but not necessarily in a reasonable time.

SUMMARY

The present disclosure relates to methods and apparatus for allocating tasks to be performed by one or more vehicles to achieve a mission objective. Generally, the task allocation system works by identifying a final task associated with a given mission objective, identifying predecessor tasks necessary to complete the final task, generating one or more candidate tasks sequences to accomplish the mission objective, generating a task allocation tree based on the candidate task sequences, and searching the task allocation tree to find a task allocation plan that meets a predetermined selection criteria (e.g., lowest cost). Based on the task allocation plan, the task allocation system determines a task execution plan and generates control data for controlling one or more vehicles to complete the task execution plan. In some examples, at least one of the one or more vehicles is an autonomous vehicle.

One aspect of the disclosure comprises method implemented by a task allocation system of sequencing tasks to be performed by one or more autonomous vehicles to meet a mission objective. In one example, the task allocation system determines a mission objective. Based on the mission objective, the task allocation system determines one or more candidate task sequences to be executed to achieve the mission objective. Each candidate task sequence comprises a final task in a task predecessor tree and one or more predecessor tasks defining a unique path through the task predecessor tree from the final task to an initial task in the task sequence. The task allocation system generates, based on the one or more candidate task sequences, a task allocation tree representing a plurality of potential task allocation plans for allocating the tasks in one or more of the candidate task sequences among the one or more autonomous vehicles. The task allocation tree comprises a root node and a plurality of child nodes, each of which corresponds to a possible allocation of one of the tasks in one of the candidate task sequences to one of the autonomous vehicles. Each task allocation plan comprises a unique path through the task allocation tree from the root node through one or more child nodes to a leaf node. The task allocation system searches the task allocation tree for a task allocation plan that meets a predetermined selection criterion (e.g. lowest cost), generates a task execution plan based on a selected task allocation plan, and generates control data for the one or more autonomous vehicles to implement the task execution plan.

Another aspect of the disclosure comprises a task allocation system for sequencing tasks to be performed by one or more autonomous vehicles to meet a mission objective. The task allocation system comprises a task sequencing module, a task allocation module, a plan generation module and a plan execution module. The task sequencing module is configured to determine, based on a mission objective, one or more candidate task sequences to be executed to achieve the mission objective. Each candidate task sequence comprises a final task in a task predecessor tree and one or more predecessor tasks defining a unique path through the task predecessor tree from the final task to an initial task in the task sequence. The task allocation module is configured to generate, based on the one or more candidate task sequences, a task allocation tree representing a plurality of potential task allocation plans for allocating the tasks in one or more of the candidate task sequences among the one or more autonomous vehicles. The task allocation tree comprises a root node and a plurality of child nodes, each of which corresponds to a possible allocation of one of the tasks in one of the candidate task sequences to one of the autonomous vehicles. Each task allocation plan comprises a unique path through the task allocation tree from the root node through one or more child nodes to a leaf node. The task allocation module is further configured to search the task allocation tree for a task allocation plan that meets a predetermined selection criterion (e.g. lowest cost). The plan generation module is configured to generate a task execution plan based on the selected task allocation plan. The plan execution module is configured to generate control data for the one or more autonomous vehicles to implement the task execution plan.

Clause 1: A method implemented by a processing circuit, the method comprising determining one or more candidate task sequences that achieve a mission objective, each candidate task sequence comprising a plurality of tasks; generating, based on the one or more candidate task sequences, a task allocation tree representing a plurality of potential task allocation plans for allocating the tasks in one or more of the candidate task sequences among one or more vehicles, wherein the task allocation tree comprises a root node and a plurality of child nodes, each child node corresponding to a possible allocation of one of the tasks in one of the candidate task sequences to one of the one or more vehicles; and each task allocation plan comprises a unique path through the task allocation tree from the root node through one or more child nodes to a leaf node; searching the task allocation tree for a task allocation plan that meets a predetermined selection criterion; generating a task execution plan based on a selected task allocation plan; and generating control data for the one or more vehicles to implement the task execution plan.

Clause 2: The method of Clause 1, wherein at least one of the one or more vehicles is an autonomous vehicle.

Clause 3: The method of Clauses 1 or 2 wherein determining the one or more candidate task sequences that achieve the mission objective comprises, for each candidate task sequence, determining a final task; and successively querying a data structure to identify for each task, beginning with the final task, the next predecessor task, if any, until an initial predecessor task in the candidate task sequence is reached.

Clause 4: The method of any of Clauses 1-3 wherein determining the one or more candidate task sequences that achieve the mission objective comprises, for each candidate task sequence, determining the final task; and successively querying a task object for the final task and a task object for each predecessor task in the candidate task sequence to determine the next predecessor task, if any, until an initial predecessor task in the candidate task sequence is reached.

Clause 5: The method of any of Clauses 1-4 wherein generating the task allocation tree comprises receiving one or more constraints related to the objective; and generating the task allocation tree based on the candidate task sequences and the received constraints.

Clause 6: The method of any of Clauses 1-5 wherein searching the task allocation tree for a task allocation plan comprises calculating costs associated with one or more of the child nodes in the task allocation tree; and searching the task allocation tree for a lowest cost plan.

Clause 7: The method of Clause 6 wherein searching the task allocation tree for a lowest cost plan comprises performing a branch and bound search of the task allocation tree.

Clause 8: The method of Clauses 6 or 7 wherein calculating costs associated with one or more of the child nodes in the task allocation tree comprises computing an initial cost estimate for one or more of the child nodes in the task allocation tree based on a heuristic calculation to reduce processing time.

Clause 9: The method of Clause 8 further comprising selecting an initial task allocation plan based on the initial cost estimate.

Clause 10: The method of Clause 9 wherein calculating costs associated with one or more of the child nodes further comprises computing a refined cost estimate for one or more child nodes.

Clause 11: The method of Clause 10 further comprising selecting or reselecting a task allocation scheme based on the refined cost estimate.

Clause 12: The method of any of Clauses 1-11 wherein generating a task execution plan based on a selected task allocation plan comprises generating, for each of one or more vehicles, at least one of a vehicle maneuvering schedule; a sensor schedule; or a control schedule for effector controls.

Clause 13: The method of any of Clauses 1-12 wherein further comprising transmitting at least a portion of the task execution plan or control data to one or more of the vehicles to which tasks have been allocated.

Clause 14: A task allocation system, the task allocation system comprising a task sequencing module configured to determine one or more candidate task sequences that achieve a mission objective, each candidate task sequence comprising a plurality of tasks; a task allocation module configured to generate, based on the one or more candidate task sequences, a task allocation tree representing a plurality of potential task allocation plans for allocating the tasks in one or more of the candidate task sequences among one or more autonomous vehicles, wherein the task allocation tree comprises a root node and a plurality of child nodes, each child node corresponding to a possible allocation of one of the tasks in one of the candidate task sequences to one of the one or more autonomous vehicles; and each task allocation plan comprises a unique path through the task allocation tree from the root node through one or more child nodes to a leaf node; and search the task allocation tree for a task allocation plan that meets a predetermined selection criterion; a plan generation module configured to generate a task execution plan based on a selected task allocation plan; and a plan execution module configured to generate control data for the one or more autonomous vehicles to implement the task execution plan.

Clause 15: The task allocation system of Clause 14 wherein the task sequencing module is further configured to, for each candidate task, determine a final task in at least one candidate task sequence; and for each candidate task sequence, successively query a data structure to identify for each task, beginning with the final task, the next predecessor task, if any, until an initial predecessor task in the candidate task sequence is reached.

Clause 16: The task allocation system of Clause 14 or 15 wherein the task sequencing module is further configured to, for each candidate task, determining a final task in at least one candidate task sequence; and successively querying a task object for the final task and a task object for each predecessor task in the candidate task sequence to determine the next predecessor task, if any, until an initial predecessor task in the candidate task sequence is reached.

Clause 17: The task allocation system of any of Clauses 14-16 wherein the task allocation module is further configured to receive one or more constraints related to the objective; and generate the task allocation tree based on the candidate task sequences and the received constraints.

Clause 18: The task allocation system of any of Clauses 14-17 wherein the task allocation module is further configured to calculate costs associated with one or more of the child nodes in the task allocation tree; and search the task allocation tree for a lowest cost plan.

Clause 19: The task allocation system of Clause 18 wherein the task allocation module is further configured to perform a branch and bound search of the task allocation tree to find the lowest cost plan.

Clause 20: The task allocation system of Clause 18 or 19 wherein the task allocation module is further configured to compute an initial cost estimate for one or more of the child nodes in the task allocation tree based on a heuristic calculation to reduce processing time.

Clause 21: The task allocation system of Clause 20 wherein the task allocation module is further configured to select an initial task allocation plan based on the initial cost estimate.

Clause 22: The task allocation system of Clause 21 wherein the task allocation module is further configured to calculate costs associated with one or more of the child nodes further comprises computing a refined cost estimate for one or more child nodes.

Clause 23: The task allocation system of Clause 22 wherein the task allocation module is further configured to select or reselect a task allocation plan based on the refined cost estimate.

Clause 24: The task allocation system of any of Clauses 14-23 wherein the plan generation module is further configured to generate a task execution plan, for each of one or more autonomous vehicles, including at least one of a vehicle maneuvering schedule; a sensor schedule; or a control schedule for effector controls.

Clause 25: The task allocation system of any of Clauses 14-24 wherein the plan execution module is further configured to transmit at least a portion of the task execution plan or control data to one or more of the autonomous vehicles to which tasks have been allocated.

DETAILED DESCRIPTION

Figure 1:
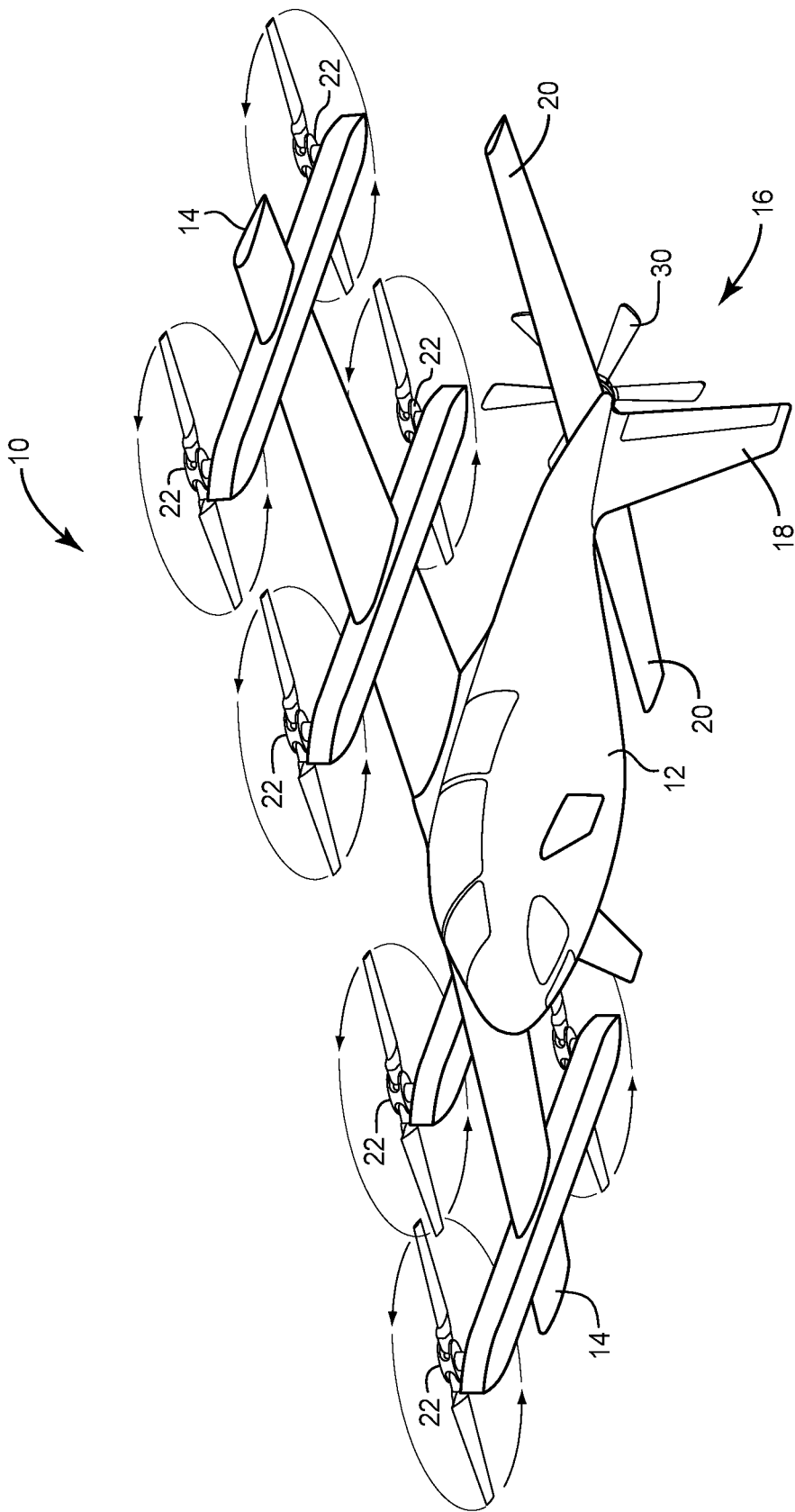
FIG. 1 illustrates an autonomous aircraft implementing the task allocation system as herein described.

Referring now to the drawings, a task allocation system 200 (FIG. 2) is described in the context of autonomous aircraft 10. Those skilled in the art will appreciate, however, that the concepts as herein described can be employed with any other type of vehicle, including without limitation automobiles, aircraft, watercraft, autonomous automobiles and autonomous watercraft.

FIG. 1 illustrates an autonomous aircraft 10 according to an exemplary example. The autonomous aircraft 10 generally comprises a fuselage 12, wings 14 extending from opposing sides of the autonomous aircraft 10 in a midsection of the fuselage 12, and an empennage or tail assembly 16 at a rear end of the fuselage 12. The tail assembly 16 comprises a vertical stabilizer 18 and two horizontal stabilizers 20 extending from opposing sides of the autonomous aircraft 10. Rotors 22 and 30 are mounted to the wings 14 of the aircraft and to the end of the tail assembly 16 respectively for lifting the autonomous aircraft 10 and propelling the autonomous aircraft 10 during flight.

Figure 2:
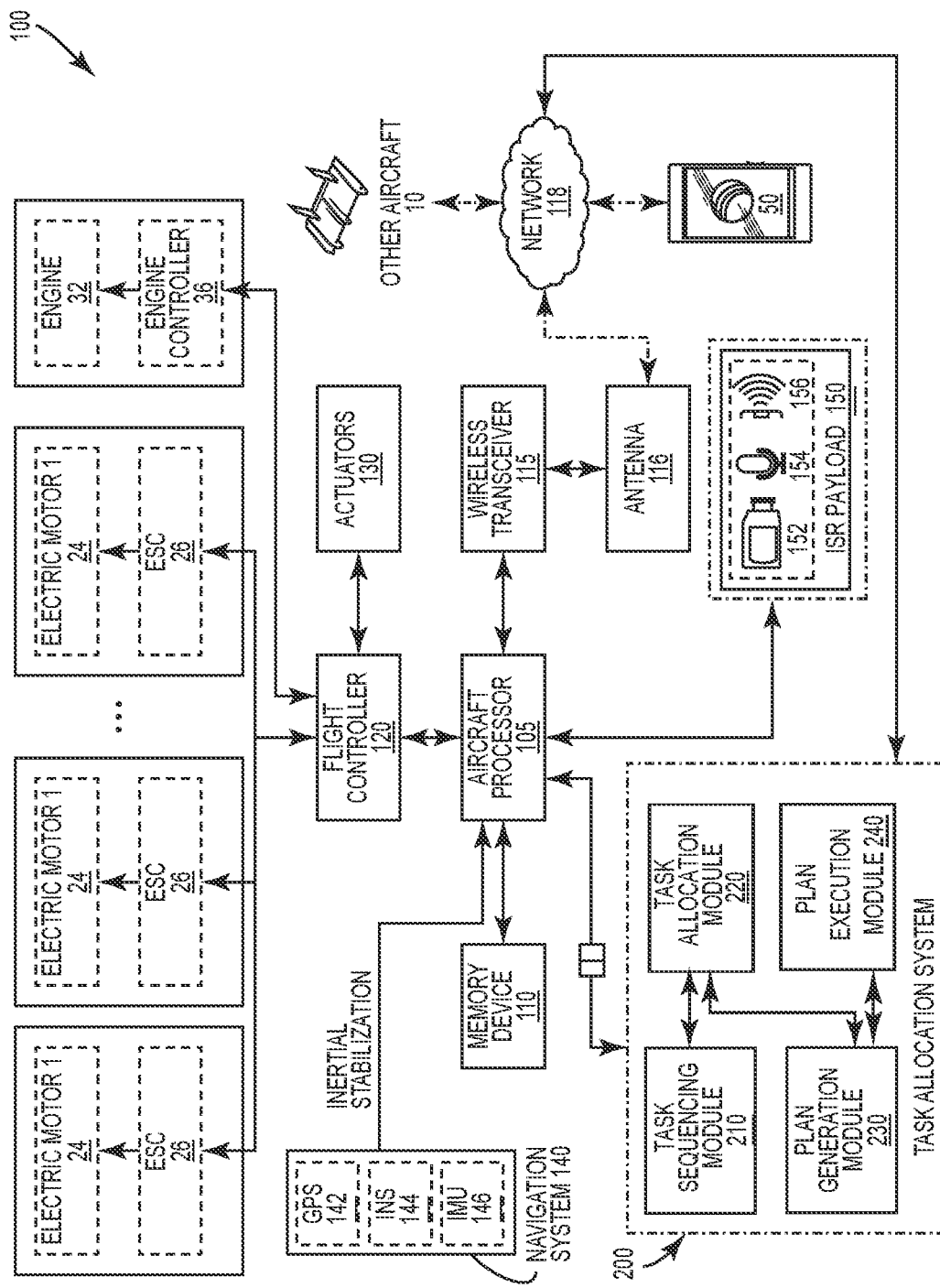
FIG. 2 illustrates an aircraft flight control system for an autonomous aircraft.

FIG. 2 is a block diagram of an example aircraft control system 100 for the autonomous aircraft 10. The aircraft control system 100 may be configured to control the various components and functions of the autonomous aircraft 10. As illustrated, the aircraft control system 100 includes one or more aircraft processors 105 communicatively coupled with at least one memory device 110, a flight controller 120, a wireless transceiver 115, a navigation system 140 and a task allocation system 200.

The aircraft processor 105 may be configured to perform one or more operations based at least in part on instructions (e.g., software) and one or more databases stored to the memory device 110 (e.g., hard drive, flash memory, or the like). The aircraft control system 100 may further include other desired services, such as a wireless transceiver 115 coupled with an antenna 116 to communicate data between the aircraft control system 100 and a remote device 50 (e.g., a human-machine interface, or other portable electronic devices, such as smartphones, tablets, laptop computers) or other controller (e.g., at a base station). The aircraft control system 100 may also communicate with another autonomous aircraft 10 via the wireless transceiver 115, thereby facilitating collaborative operations, for example.

In certain aspects, the aircraft control system 100 may communicate data (processed data, unprocessed data, etc.) with the remote device 50 and/or another autonomous aircraft 10 over a network 118. In certain aspects, the wireless transceiver 115 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), W-Fi (e.g., Institute of Electrical and Electronics Engineers' (IEEE) 802.11 standards), etc. The remote device 50 may facilitate monitoring and/or control of the aircraft control system 100 and its payload(s), including an ISR payload 150.

The aircraft processor 105 may be operatively coupled to the flight controller 120 to control operation of the various actuators 130 (e.g., those to control movement and locking of any flight surfaces, such as the moveable flight control surfaces, electric motor 24 (e.g., via an electronic speed controller (ESC) 26, and/or engines 32 (e.g., via an engine controller 36) in response to commands from an operator, autopilot, a navigation system 140, or other high-level system via the wireless transceiver 115. In certain aspects, the aircraft processor 105 and the flight controller 120 may be integrated into a single component or circuit. In operation, the flight controller 120 may dynamically (i.e., in real-time or near real-time) and independently adjust thrust during the various stages of flight via the ESC 26 or engine controller 36 (as the case may be) to control roll, pitch, or yaw of the autonomous aircraft 10. When rotors with rotor blades (e.g., propellers) are used, the flight controller 120 may vary the revolutions per minute (RPM) of the rotor and/or, where desired, vary the pitch of the rotor blades. For example, the electric motors 24 may be controlled by adjusting power supplied to each electric motor from a power supply (e.g., a battery pack or a battery bank) via the ESC 26.

The aircraft processor 105 may be operatively coupled to the navigation system 140, which may include the GPS 142 that is communicatively coupled with an Inertial Navigation system (INS) 144 and/or an Inertial Measurement Unit (IMU) 146, which can include one or more gyroscopes, accelerometers and/or magnetometers. The GPS 142 gives an absolute drift-free position value that can be used to reset the INS solution or can be blended with it by use of a mathematical algorithm, such as a Kalman Filter. The navigation system 140 may communicate, inter alia, inertial stabilization data to the aircraft processor 105.

To collect data and/or monitor an area, the aircraft control system 100 may be equipped with additional sensors, such as an ISR payload 150 comprising, for example, one or more cameras 152 (e.g., an optical instrument for recording or capturing images and/or video, including light detection and ranging (LiDAR) devices), audio devices 154 (e.g., microphones, echolocation sensors, etc.), and other sensors 156 to facilitated ISR functionality and provide ISR data (e.g., photographs, video, audio, sensor measurements, etc.). The ISR payload 150 is operatively coupled to the aircraft processor 105 to facilitate communication of the ISR data (sensor data) between the ISR payload 150 and the aircraft processor 105. The ISR data may be used to navigate the autonomous aircraft 10 and/or otherwise control the autonomous aircraft 10. In certain aspects, the ISR payload 150 may be rotatably and pivotally coupled to, for example, the underside surface of the airframe (or another structural component, such as the rotor booms or the wings 14) via a gimbal system to enable the ISR payload 150 to be more easily oriented downward to monitor objects below and/or on the ground. The data may be dynamically or periodically communicated from the aircraft control system 100 to the remote device 50 over the network 118 via the wireless transceiver 115, or stored to the memory device 110 for later access or processing.

The task allocation system 200 as described below determines a sequence of tasks to be performed to meet a mission objective and to allocate or assign the tasks in scenarios where more than one autonomous aircraft 10 is available to perform the tasks. In some examples, the task allocation system 200 is integrated with the aircraft control system 100 as shown in FIG. 2 and can share components (e.g., aircraft processor 105 and memory device 110) with the aircraft control system 100. In other examples, the task allocation system 200 may be separate from the aircraft control system 100 (e.g., located in another autonomous aircraft 10 or on the ground) and communicate with the aircraft control system via the wireless transceiver 115 or an internal network in the autonomous aircraft 10.

FIG. 2 illustrates the main functional components of the task allocation system 200 according to one example. The main functional components comprise a task sequencing module 210, a task allocation module 220, a plan generation module 230 and a plan execution module 240. Additional modules can also be included. Each of the modules 210-240 can be implemented by one or more microprocessors, hardware circuits, firmware or a combination thereof.

One of the purposes of the task allocation system 200 is to find possible sequences of tasks, referred to herein as candidate task sequences, that can satisfy a mission objective, and to allocate the tasks that need to be performed to meet the mission objective to a group of one or more autonomous vehicles. The term mission objective can refer to any objective of a mission, whether it be a final objective of a mission or an intermediate objective that needs to be performed to achieve the final objective. The task allocation system 200 can, in some examples, determine task sequences and task assignments to achieve the final objective of a mission. In other examples, the task allocation system 200 may be given an intermediate objective. In this case, the task allocation system 200 determines task sequences and task assignments to achieve the intermediate objective of a mission. From the perspective of the task allocation system 200, the final task is the last task performed to meet the mission objective, whether it be the final objective or an intermediate objective. Thus, the task allocation system 200 may be used to determine task sequences and task assignments for all or part of an overall mission.

Within the task allocation system 200, a task is represented by a data structure or object containing the following information:

Heuristic calculation—a cost estimate that's very fast to calculate and is equal to or less than the actual cost.

Cost—the actual cost of a task.

Plan generation—generate detailed execution data and recommend additional task predecessors if necessary.

Execution—a module that ingests task execution data and generates data for a vehicle maneuvering system (VMS) to execute. This function will be called at a constant rate to support coordinated control applications, or regular monitoring of task execution.

Task Predecessors—Recommended task predecessors.

Generally, the task allocation system 200 works by identifying a final task associated with a given mission objective, identifying predecessor tasks necessary to complete the final task, generating one or more candidate tasks sequences to accomplish the mission objective, generating a task allocation tree based on the candidate task sequences, and searching the task allocation tree to find a low cost task allocation plan. "Cost" is defined as a general cost and/or constraint in resources to achieve a certain task. e.g., time to complete, distance to target, vehicle's survivability, risk minimization, efficiency, fuel, and constraints such as, vehicle status (altitude, speed, etc.), operational/capability limitations (turn radius, max climb rate, max altitude, max speed, etc.), sensor operational limitation (visibility, resolution, scan rate, etc.), and environmental constraints (e.g., weather condition, time of day, lights, terrain condition, DVE factors, no-fly zone, limited airspace, etc. or even an actual financial cost in achieving the task. Once a task allocation plan is identified, the execution data associated with each task is used to generate control signals for a VMS to execute.

One of the difficult aspects of task allocation is finding possible sequences of tasks that can satisfy the mission objective. This aspect of the task allocation process is handled by the task sequencing module 210. The task sequencing module 210 solves this problem by defining a task predecessor tree. The task predecessor tree is one example of a non-linear data structure that can be used to enumerate the possible candidate sequences that could be used to achieve the mission objective. The task allocation tree is a special type of directed graph that the task sequencing module 210 uses to enumerate through the tasks comprising the candidate task sequences. The root node of the task predecessor tree represents a final task associated with the mission objective. The leaf nodes in the task predecessor tree represent initial tasks for different candidate task sequences. Each candidate task sequence comprises a unique path traced backward through the task predecessor tree from the root node to a leaf node.

The task predecessor tree enables a computation method to identify candidate task sequences that can be performed to complete the mission objective. The mission objective is input to the task allocation system 200 (via human interface or signaling via a remote device 50) and the task sequencing module 210 determines the predecessor tasks and candidate task sequences that will meet the mission objective on the fly. The task sequencing module 210 starts with the final task that, if completed, will complete the mission objective. The task sequencing module 210 then constructs the task predecessor tree by working backwards from the final task to find predecessor tasks until it reaches the first or initial task in a candidate task sequence. Each task is capable of identifying one or more possible predecessor tasks. The task sequencing module 210 queries each task to find all predecessor tasks and sets those tasks as children in the task predecessor tree. The child tasks are then queried for predecessor tasks. This process continues until there are no more predecessor tasks, i.e., when the initial task is reached.

While the task predecessor tree as a whole comprises a non-linear data structure, portions of the task predecessor can be defined by a predetermined sequence of steps. For example, assume that a unit of task is to locate a target. This task could include a preset sequence of steps of (1. scan the field of view; 2. eliminate sky; 3. locate target) that is stored in a linear data structure. This linear data structure can be used when enumerating the task predecessor tree. Continuing with the same example, when the task sequencing module 210 enumerates the "Locate Target" task, this task can be exploded to include the sequence of steps needed to perform the "Locate Target" task. The task sequencing module 210 then continues the search for the predecessor of the "Locate Target" task.

Figure 3:
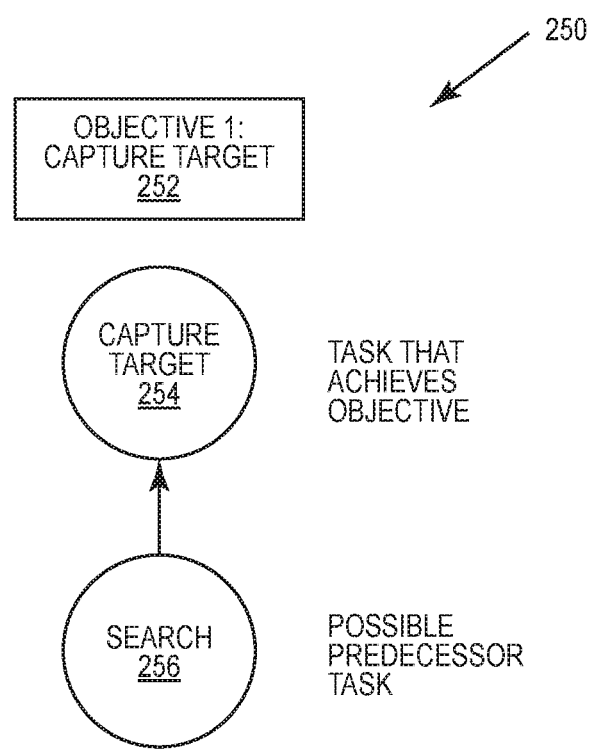
FIG. 3 illustrates a simple task predecessor tree for determining candidate task sequences.

A simple example of task sequencing is shown in FIG. 3. The mission objective 252 is to capture a target. The autonomous aircraft 10 starts in a location but does not know the location of the target. The task "Capture Target" 254 is associated with the mission objective and is the final task need to complete the mission objective. However, the target location is not known. The task sequencing module 210 begins constructing a task predecessor tree 250 by making the "Capture Target" task 254 the root node in the task predecessor tree 250. In order to identify tasks that will find that target, the task sequencing module 210 queries the "Capture Target" task 254 to find that the "Search" task 256 is a possible predecessor task. The task sequencing module 210 adds the "Search" task 256 to the task predecessor tree 250 as a child node. In this example, there are no predecessors to "Search" task 256. Thus, the autonomous aircraft 10 can start with the "Search" task 256 to find the intended target and then proceed to the "Capture Target" task 254.

Figure 4:
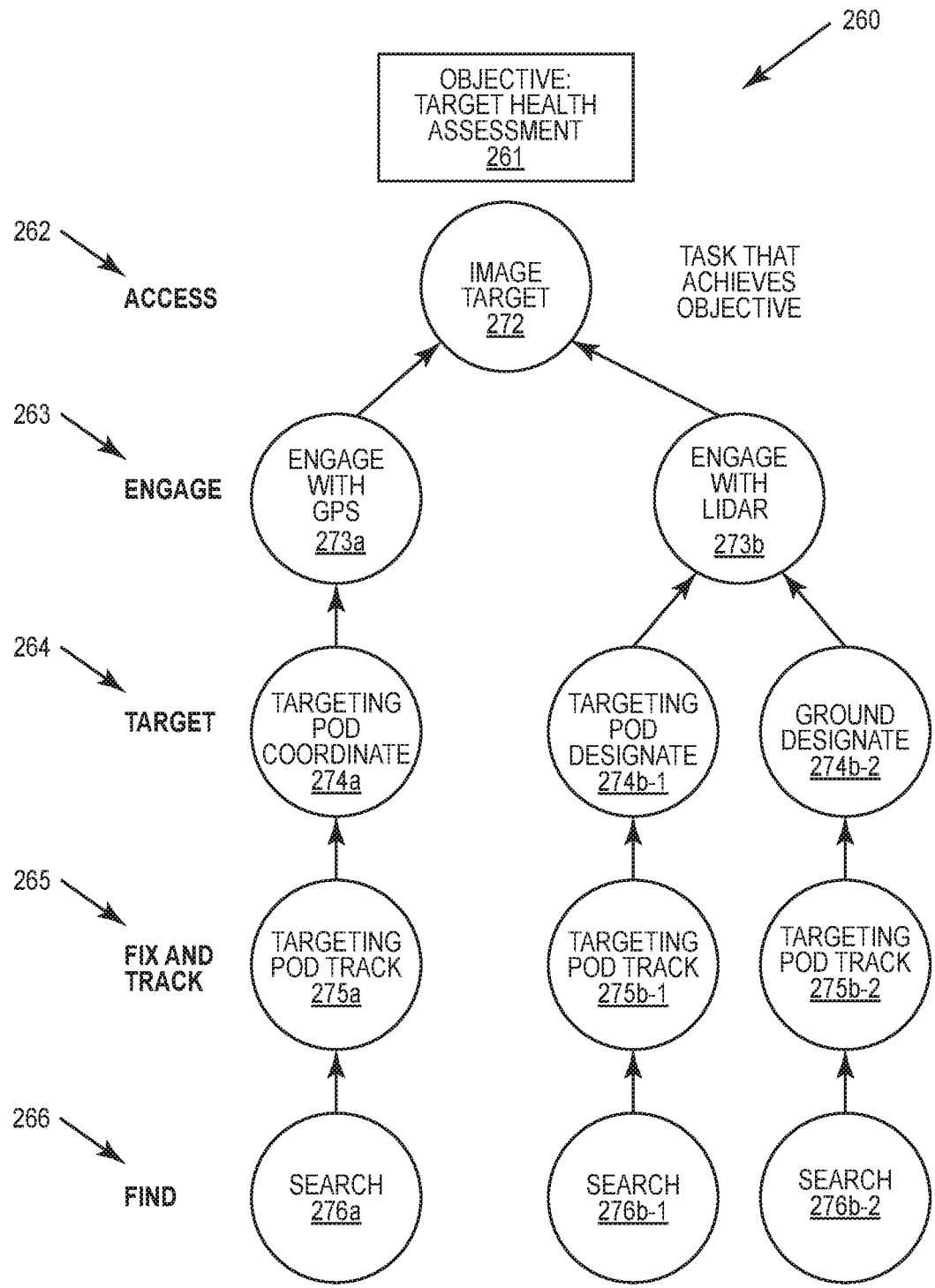
FIG. 4 illustrates a more complex task predecessor tree for determining candidate task sequences.

FIG. 4 illustrates a more slightly more complex example of task sequencing. The objective for this task predecessor tree 260 is to perform health assessment 261 of a target. Target health assessment 261 is the final step in a kill chain (find 266, fix and track 265, target 264, engage 263, assess 262). The previous steps of the kill chain 262-266 need to be executed before completing the objective of target health assessment 261. The task sequencing module 210 finds the final task associated with the objective target health assessment 261, which is "Image Target" 272, sets that as the root node in the task predecessor tree 260, and works backwards to identify the predecessor tasks 273a-276a or 273b-276b. Each time a predecessor task is identified it is queried for predecessor tasks to continue generating the task predecessor tree 260 (e.g., generating a child node). The leaf nodes 276a, 276b-1, 276b-2 are tasks that the vehicle can start with. The root node (e.g., "Image Target" 272) is a task that can complete the objective. In this case, the algorithm found that "Search" (e.g., 276a, 276b-1, 276b-2) is a good task to start with in finding targets. The following tasks then give varying candidate task sequences that can be performed to arrive at the final task (Image Target 272) to complete the objective 261.

Figure 5:
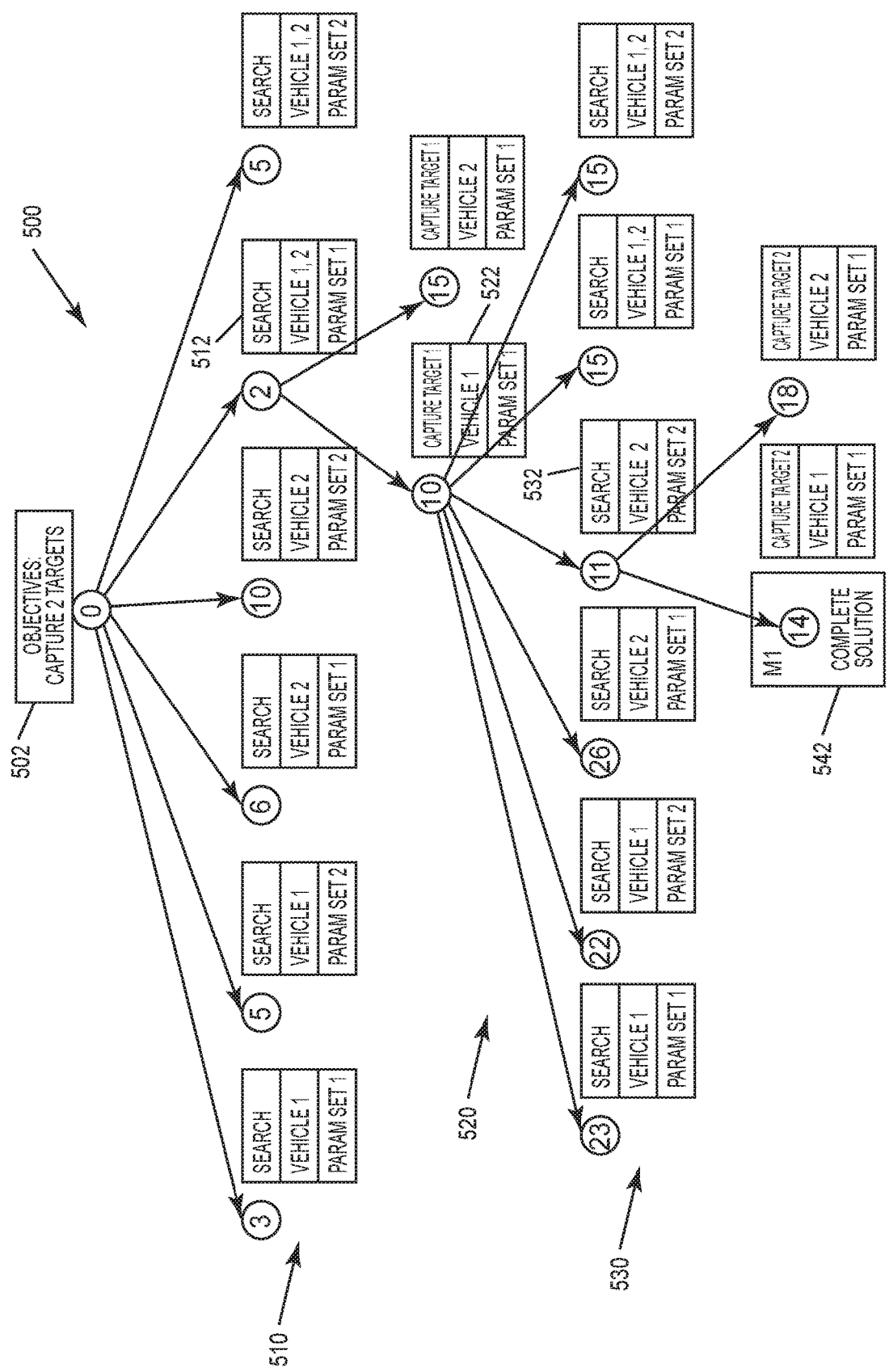
FIGS. 5-10 illustrate a branch and bound search of a task allocation tree.

Once the candidate task sequences are identified, the task allocation module 220 enumerates and organizes the tasks into a task allocation tree that can be searched by branch and bound to find an optimal or near optimal task allocations or assignments. The task allocation tree is one example of a non-linear data structure that can be used to enumerate the possible task allocations. The task allocation tree, an example of which is illustrated in FIG. 5, is a special type of directed graph that the task allocation system uses to enumerate through combinations of task types, assignment of each task to one or more vehicles, possible parameters of each task, and scheduling of tasks. The task allocation tree is a non-linear data structure that organizes these combinations. The root node of the tree, such as the root node 502 in the example task allocation tree 500 of FIG. 5, represents no assignments to vehicles. Level 1 of the tree (e.g., 510 in FIG. 5), the children of the root node, have all combinations of task types, assignments, and parameters that the vehicles can start with. Level 2 (e.g., 520 in FIG. 5) refers to children of the Level 1 nodes, Level 3 (e.g., 530 in FIG. 5) refers to children of the level 2 nodes, and so forth until a leaf node is reached. Each level represents a possible task allocation given the previous task assignments. An example task allocation tree 500 is shown in the FIGS. 5-10 at various phases of the task allocation process. This example is based on the simple task predecessor tree 250 shown in FIG. 3 including two tasks: "Capture Target" 254 and "Search" 256. In this example, the mission has two objectives, capture target 1 and capture target 2 and there are two vehicles. Level 1 510 of the tree looks at all possible assignments for the "Search" task 256, the leaf node of the task predecessor tree 250, to find either target, including parameter changes. Level 2 520 then looks to the parents of each node's assigned task, in this case "Capture Target" 254, in the task predecessor tree 250. Those parents and possible combinations become children of that node. The children then expand in the same way, looking at their parents in the task predecessor tree. The task allocation tree 250 very quickly explodes into a combinatorial set of options that, in general, are not possible to process in reasonable time or even keep in memory.

The task allocation tree 500 shown in FIGS. 5-10 is a simple example where each child node in the task allocation tree has a single parent. It is possible that for a child node to be connected to multiple parents.

In various examples, the task allocation module 220 performs a branch and bound search of the task allocation tree 500 to find a solution quickly and uses the costs of that solution to prune large parts of the tree. The task allocation system 200 performs a greedy search through the tree 500 using a heuristic calculation to find a node to expand, finds the true cost (constraint) of that node, and then expands it. The cost of each node is the cost of the task assignment at that node (shown in a circle), plus all parent task assignments to the root of the tree. This yields a monotonically increasing cost. The greedy expansions continue until a first solution is found at a leaf node. This node means all objectives have been completed. The cost of this solution creates a bound on all other nodes. Any node that exceeds this cost can be pruned from the tree. The task allocation module 220 then continues a depth first search, pruning branches of the tree if the cost exceeds the current best solution, and improving on that solution if better solutions are found.

Figure 6:
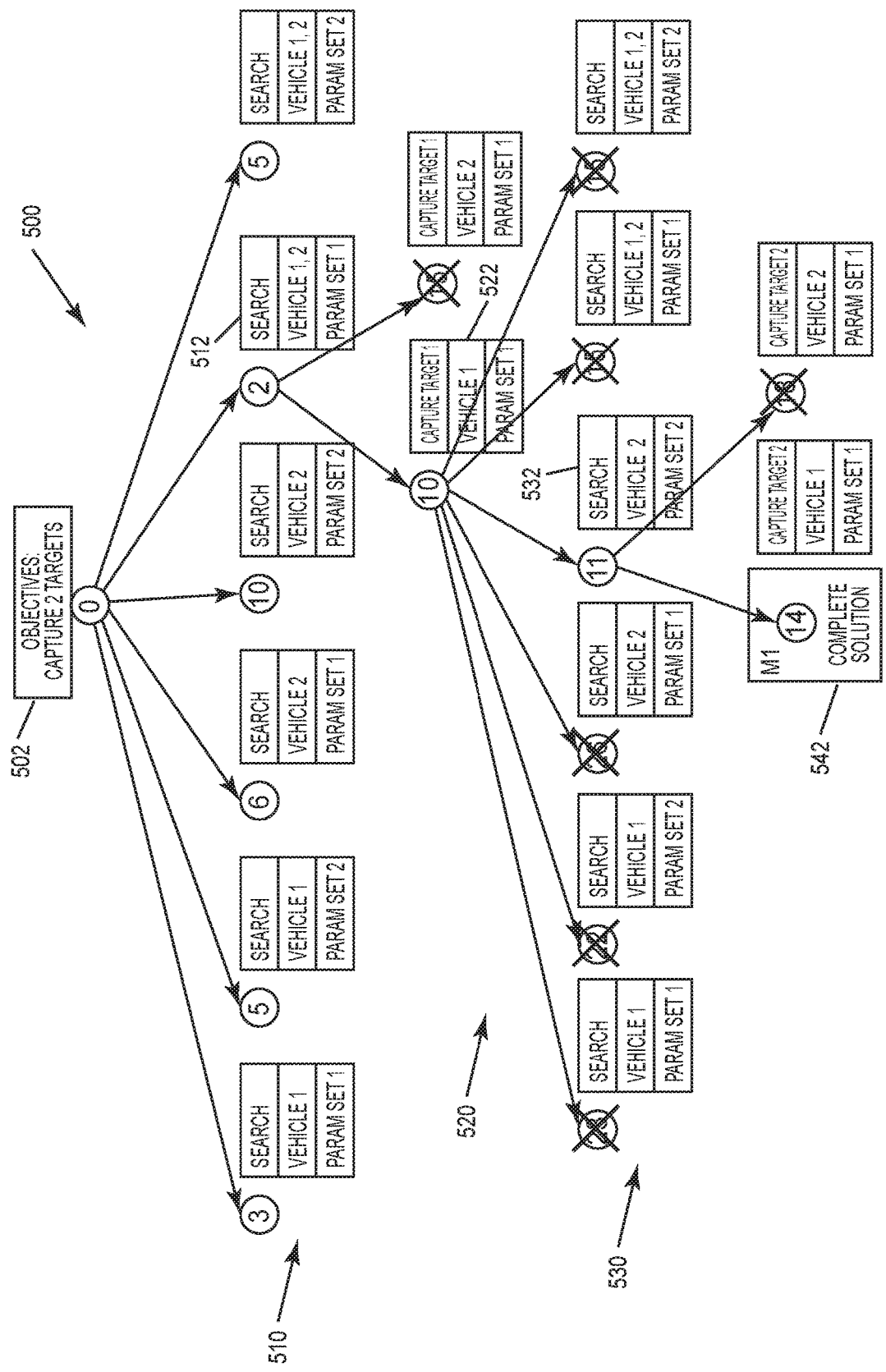

The task allocation module 220 initially performs a greedy search to quickly find a solution 542, denoted M1, as shown in FIG. 5. During the greedy search, the task allocation module 220 searches at each level to find the lowest cost node until it reaches a leaf node. In this example, the lowest cost node 512 at Level 1 has a cost of 2. Searching down the branch rooted at this Level 1 node, the lowest cost Level 2 node 522 has a cost of 10, the lowest cost node 532 at Level 3 has a cost of 11 and the lowest cost leaf node 542 has a cost of 14, which represents the solution M1. Once the greedy solution is completed, the task allocation module 220 prunes the branches (shown with an X) at nodes having a cost greater than 14 (the cost of the greedy solution) as shown in FIG. 6.

Figure 7:
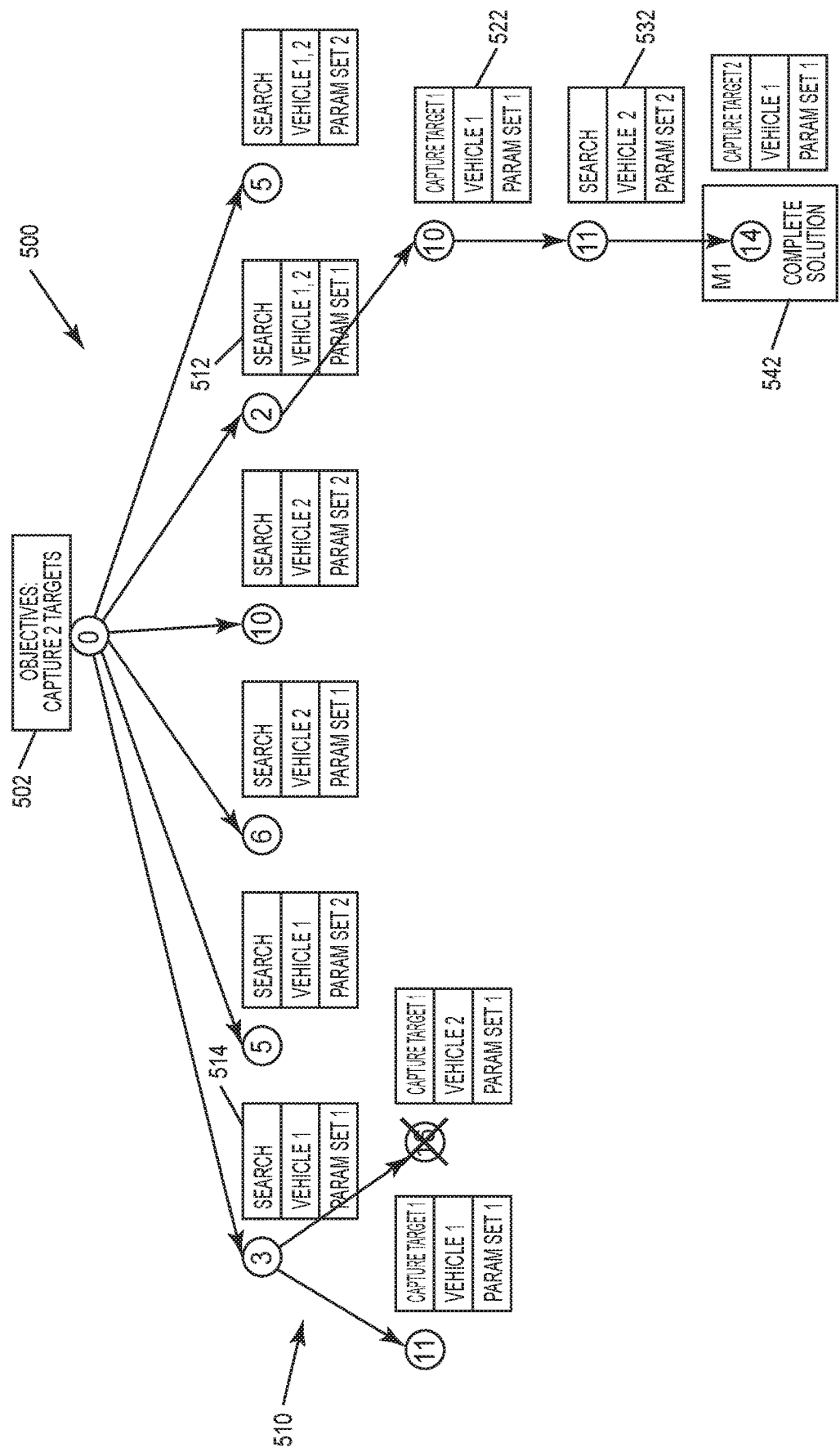
Figure 8:
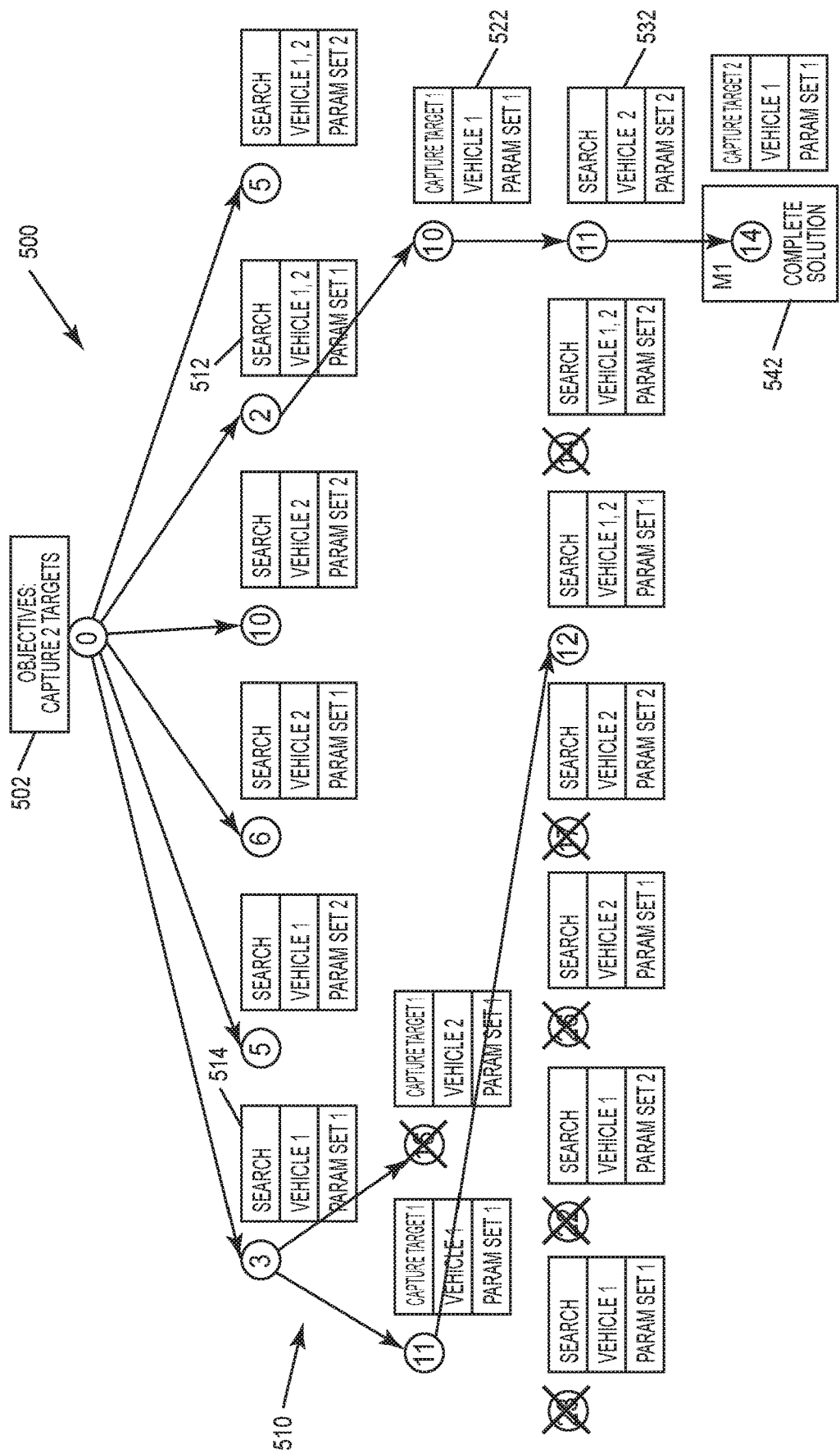
Figure 9:
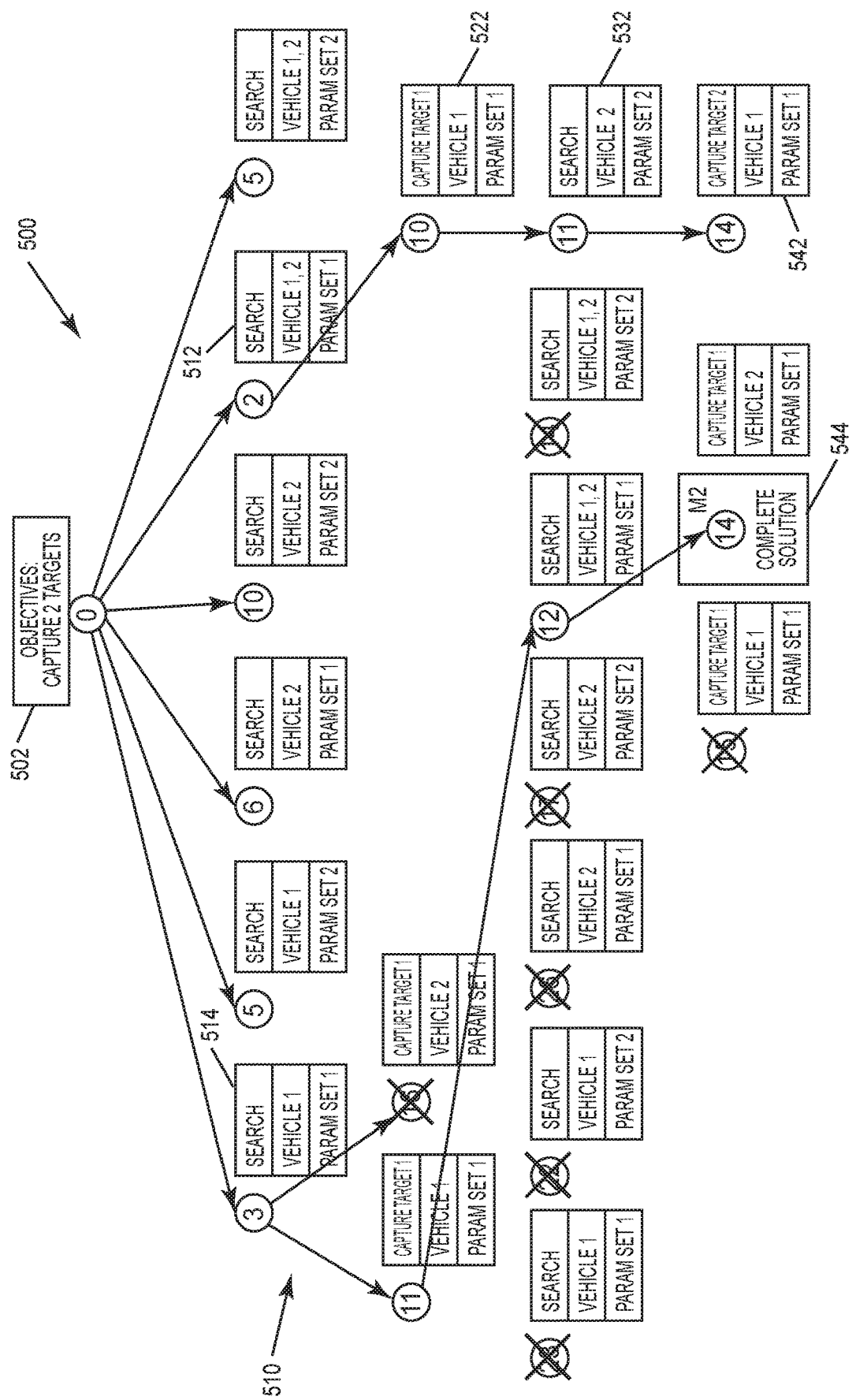

In FIG. 7, the task allocation module 220 returns to another Level 1 node 514 (with cost=3) and continues the search. In this case, the search returns to the Level 1 node 514 with a cost of 3 (the next lowest cost Level 1 node) and searches down this branch, pruning it at nodes with a cost greater than 14 as shown in FIGS. 7-9. FIG. 7 shows a branch with cost=16 rooted at Level 2 being pruned since it is greater than the cost of the current best solution. This branch does not need to be searched. In FIG. 8, another 5 branches rooted at Level 3 are pruned. In FIG. 9, a new solution 544 is denoted M2 with cost=14.

Figure 10:
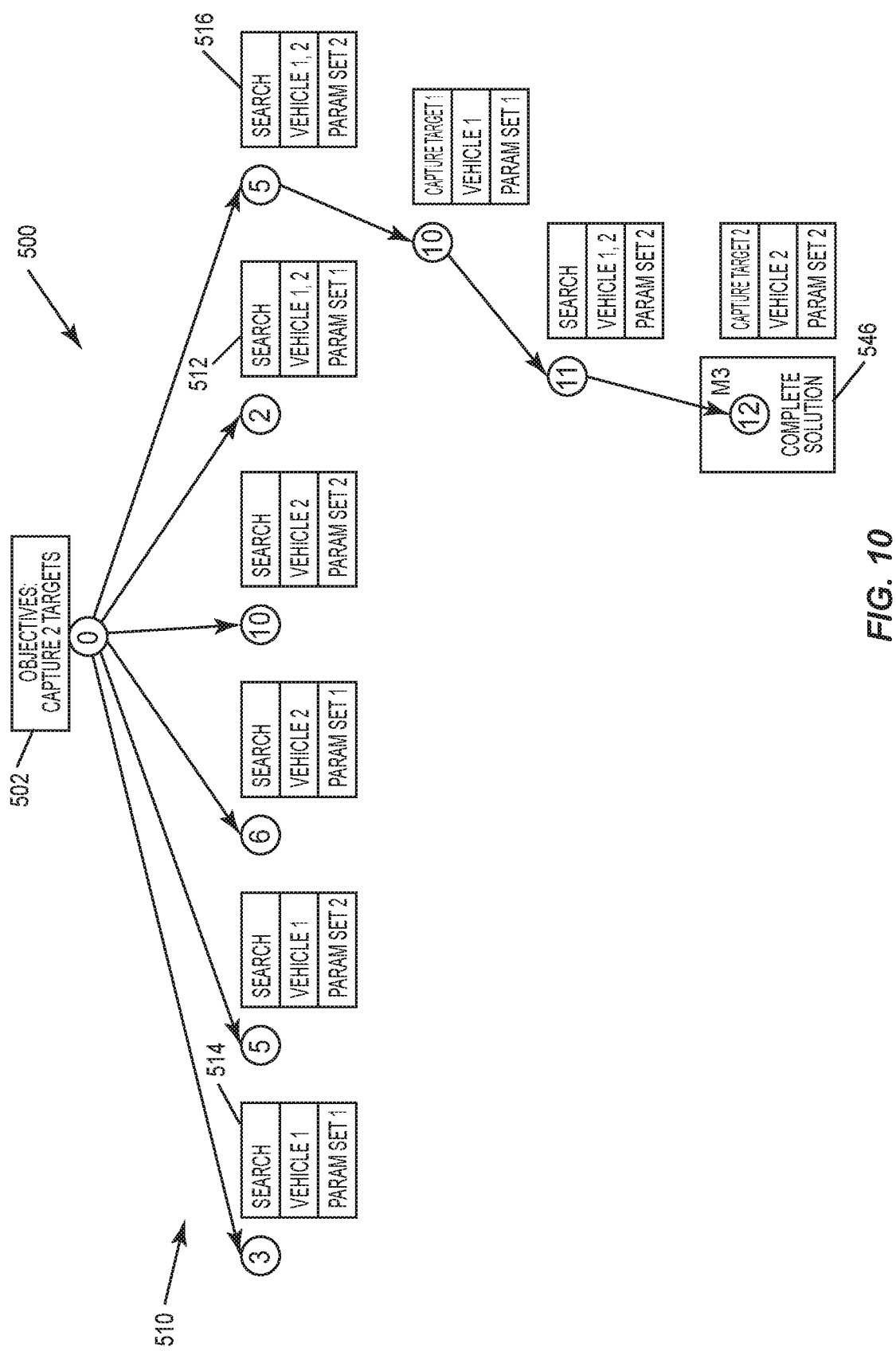

In FIG. 10, the task allocation module 220 returns to another Level 1 node 516 (with cost=5) and continues the search. Searching down this branch, that task allocation finds a new best solution 546 denoted M3 with cost=12. Once all nodes are searched (if possible), the optimal solution or task allocation plan is found, which in this example is M3.

Once the task allocation plan is determined by the task allocation module, the plan generation module 230 uses the execution data associated with the tasks assignments to generate a task execution plan. The task execution plan may include one or more of a vehicle maneuvering schedule, a sensor schedule, or a control schedule for effector controls. In some examples, the plan generation module 230 may recommend additional predecessor tasks if necessary. The plan execution module 240 receives the task execution plan from the plan generation module and generates control data to implement the execution plan and, in one example, provides the control data to the aircraft control system 100.

In another example, the plan execution module 240 transmits at least a portion of the task execution plan or control data to one or more of the autonomous vehicles to which tasks have been allocated.

The task allocation system 200 as herein described provides an efficient method of allocation tasks to complete a mission objective among one or more autonomous aircraft 10. The task structure sets up a generic baseline for third parties to generate new tasks that will interact with task allocation. It helps all the other parts of examples described herein. The task predecessor tree aids the task allocation tree such that it does not have to enumerate all possible tasks to find valid predecessors.

Figure 11:
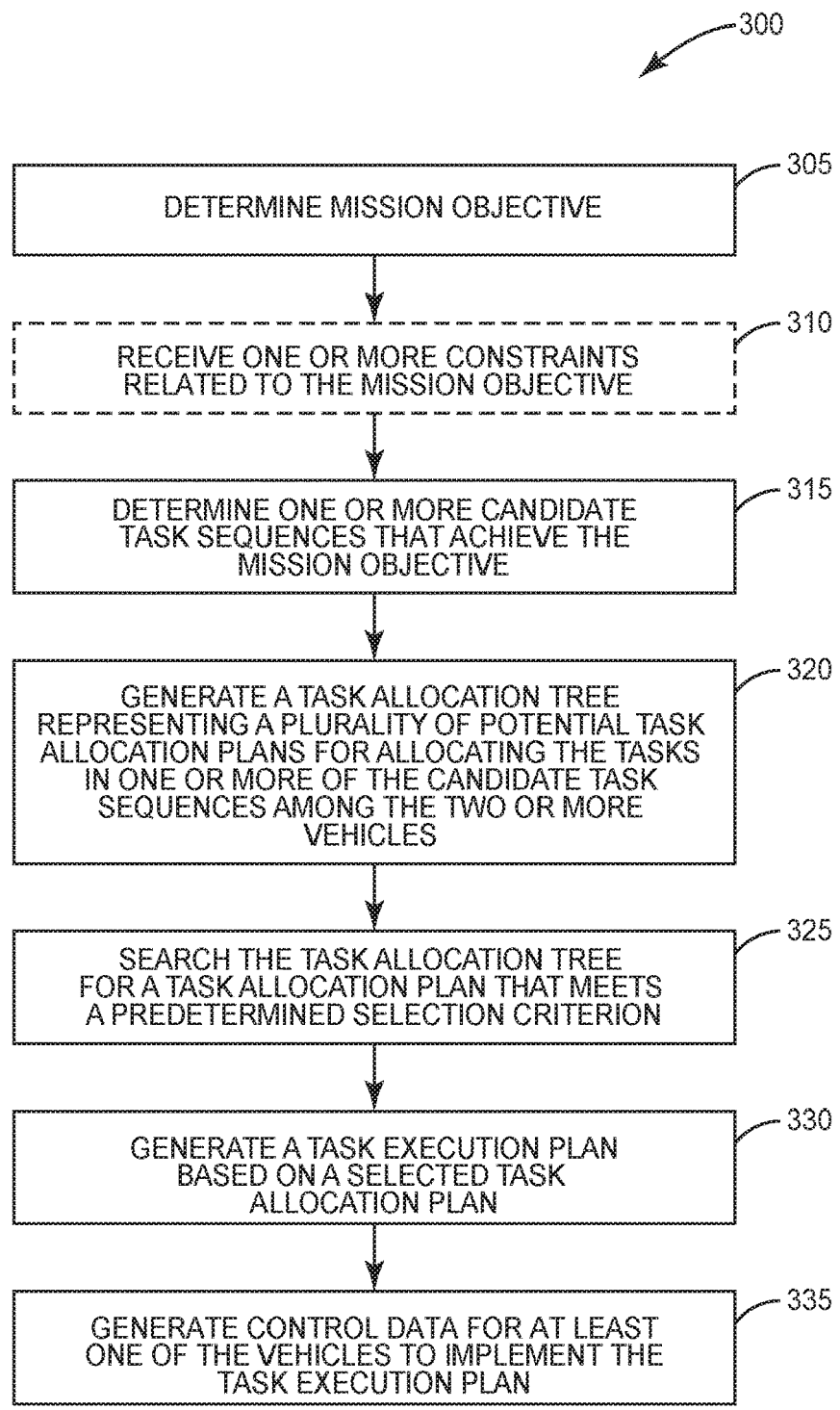
FIG. 11 illustrates an exemplary method implemented by the task allocation system.

FIG. 11 illustrates an exemplary method 300 implemented by a task allocation system 200 of sequencing tasks to be performed by one or more vehicles (e.g., autonomous aircraft 10) to meet an objective. The task allocation system 200 may be mounted on board a vehicle or in a remote location. The task allocation system 200 determines a mission objective, which may be received via a communication network, or input via a human interface (block 305). In some examples, the task allocation system 200 may determine the mission objective from other information provided to the task allocation system 200. The task allocation system 200 can optionally receive one or more constraints related to the mission objective (block 310). Once the mission objective and constraints, if any are determined, the task allocation system 200 determines one or more candidate task sequences to be executed to achieve the mission objective (block 315). In one example, each candidate task sequence comprises a final task in a task predecessor tree and one or more predecessor tasks defining a unique path through the task predecessor tree from the final task to an initial task in the task sequence. The task allocation system 200 generates, based on the one or more candidate task sequences, a task allocation tree representing a plurality of potential task allocation plans for allocating the tasks in one or more of the candidate task sequences among the one or more vehicles (block 320) The task allocation tree comprises a root node and a plurality of child nodes, each of which corresponds to a possible allocation of one of the tasks in one of the candidate task sequences to one of the vehicles. Each task allocation plan comprising a unique path through the task allocation tree from the root node through one or more child nodes to a leaf node. The task allocation system 200 searches the task allocation tree for a task allocation plan that meets a predetermined selection criterion (block 325) and generates a task execution plan based on a selected task allocation plan (block 330). Finally, the task allocation system 200 generates control data for the one or more vehicles to implement the task execution plan (block 335). Alternatively, the task allocation system 200 could communicate the task execution plan to one or more of the vehicles.

In some examples of the method 300, the task allocation system 200 determines the one or more candidate task sequences to be executed to achieve the objective by determining the final task, and, for each candidate task sequence, successively querying a data structure to identify for each task, beginning with the final task, the next predecessor task, if any, until the initial predecessor task in the candidate task sequence is reached.

In some examples of the method 300, the task allocation system 200 determines the one or more candidate task sequences to be executed to achieve the objective by determining the final task, and for each candidate task sequence, successively querying a task object for the final task and a task object for each predecessor task in the candidate task sequence to determine the next predecessor task, if any, until the initial predecessor task in the candidate task sequence is reached.

In some examples of the method 300, generating the task allocation tree comprises receiving one or more constraints related to the objective, generating the task allocation tree based on the candidate task sequences and the received constraints.

In some examples of the method 300, searching the task allocation tree for task allocation plan comprises calculating costs associated with one or more of the child nodes in the task allocation tree, and searching the task allocation tree for a lowest cost plan.

In some examples of the method 300, searching the task allocation tree for a lowest cost plan comprises performing a branch and bound search of the task allocation tree.

In some examples of the method 300, calculating costs associated with one or more of the child nodes in the task allocation tree comprises computing an initial cost estimate (e.g., heuristic cost) for one or more of the child nodes in the task allocation tree based on a heuristic calculation to reduce processing time.

In some examples of the method 300, heuristic cost estimates can be used to narrow down the child nodes to choose for the expansion in the task allocation tree.

Some examples of the method 300 further comprise selecting an initial task allocation plan based on the initial cost estimate.

In some examples of the method 300, calculating costs associated with one or more of the child nodes further comprises computing a refined cost estimate for one or more child nodes.

Some examples of the method 300 further comprise selecting or reselecting a task allocation scheme based on the refined cost estimate.

In some examples of the method, generating a task execution plan based on a selected task allocation plan comprises generating, for each of one or more vehicles, at least one of a vehicle maneuvering schedule, a sensor schedule, or a control schedule for effector controls.

In some examples of the method 300, communicating the task execution plan and/or control data over a communication network to one or more remote network nodes. In one example, communicating the task execution plan and/or control data over a communication network comprises transmitting at least a portion of the task execution plan and/or control data to one or more of the vehicles to which tasks have been allocated.

Some examples of the method 300 further comprise controlling one or more of the vehicles responsive to the control data. For example, the method may comprise controlling the vehicle maneuvering, sensors, or effector controls. The control of the vehicle can be performed by the aircraft processor 105 or flight controller 120.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent or alternating manner.

The above description of illustrated implementations, including what is described in the Abstract, is not intended to be exhaustive or to limit the scope of the disclosure to the precise forms disclosed. While specific implementations and examples are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs.

What is claimed is:

1. A method, implemented by a processing circuit, of allocating task among one or more vehicles, the method comprising:
   determining one or more candidate task sequences that achieve a mission objective, each candidate task sequence comprising a plurality of tasks;
   generating, based on the one or more candidate task sequences, a task allocation tree representing a plurality of potential task allocation plans for allocating the tasks in one or more of the candidate task sequences among one or more vehicles, wherein:
      the task allocation tree comprises a root node and a plurality of child nodes, each of the plurality of child nodes corresponding to a possible allocation of one of the tasks in one of the candidate task sequences to one of the one or more vehicles; and
      each task allocation plan comprises a unique path through the task allocation tree from the root node through one or more child nodes to a leaf node;
   searching the task allocation tree for a task allocation plan that meets a predetermined selection criterion;
   generating a task execution plan based on a selected task allocation plan; and
   after generating the task execution plan, controlling the one or more vehicles to complete the task evaluation plan, wherein the controlling comprises:
      generating control data that causes the one or more vehicles to execute the tasks in the task execution plan; and
   transmitting at least a portion of the task execution plan or the control data to the one or more vehicles to which the tasks have been allocated.

2. The method of claim 1, wherein determining one or more candidate task sequences that achieve a mission objective comprises determining, for at least one of the plurality of tasks, a preset sequence of steps stored in a linear data structure to perform the task.

3. The method of claim 1 wherein determining the one or more candidate task sequences that achieve the mission objective comprises, for each candidate task sequence:
   determining a final task; and
   successively querying a data structure to identify for each task, beginning with the final task, the next predecessor task, if any, until an initial predecessor task in the candidate task sequence is reached.

4. The method of claim 1 wherein determining the one or more candidate task sequences that achieve the mission objective comprises, for each candidate task sequence:
   determining the final task; and
   successively querying a task object for the final task and a task object for each predecessor task in the candidate task sequence to determine the next predecessor task, if any, until an initial predecessor task in the candidate task sequence is reached.

5. The method of claim 1 wherein generating the task allocation tree comprises:
   receiving one or more constraints related to the objective; and generating the task allocation tree based on the candidate task sequences and the received constraints.

6. The method of claim 1 wherein searching the task allocation tree for a task allocation plan comprises:
  calculating costs associated with one or more of the child nodes in the task allocation tree; and
  searching the task allocation tree for a lowest cost plan.

7. The method of claim 6 wherein searching the task allocation tree for a lowest cost plan comprises performing a branch and bound search of the task allocation tree.

8. The method of claim 6 wherein calculating costs associated with one or more of the child nodes in the task allocation tree comprises computing an initial cost estimate for one or more of the child nodes in the task allocation tree based on a heuristic calculation to reduce processing time.

9. The method of claim 8 further comprising selecting an initial task allocation plan based on the initial cost estimate.

10. The method of claim 9 wherein calculating costs associated with one or more of the child nodes further comprises computing a refined cost estimate for one or more child nodes.

11. The method of claim 10 further comprising selecting or reselecting a task allocation scheme based on the refined cost estimate.

12. The method of claim 1 wherein generating a task execution plan based on a selected task allocation plan comprises generating, for each of one or more vehicles, at least one of:
  a vehicle maneuvering schedule;
  a sensor schedule; or
  a control schedule for effector controls.

13. A task allocation system, the task allocation system comprising:
  a task sequencing module configured to determine one or more candidate task sequences that achieve a mission objective, each candidate task sequence comprising a plurality of tasks;
  a task allocation module configured to:
    generate, based on the one or more candidate task sequences, a task allocation tree representing a plurality of potential task allocation plans for allocating the tasks in one or more of the candidate task sequences among one or more autonomous vehicles, wherein:
      the task allocation tree comprises a root node and a plurality of child nodes, each of the plurality of child nodes corresponding to a possible allocation of one of the tasks in one of the candidate task sequences to one of the one or more vehicles; and
      each task allocation plan comprises a unique path through the task allocation tree from the root node through one or more child nodes to a leaf node; and
    search the task allocation tree for a task allocation plan that meets a predetermined selection criterion;
  a plan generation module configured to generate a task execution plan based on a selected task allocation plan; and
  a plan execution module configured to control the one or more vehicles, the plan execution module configured to generate control data that is transmitted to at least one of the vehicles after the task execution plan has been generated to cause the at least one vehicle to execute one or more of the tasks to implement the task execution plan.

14. The task allocation system of claim 13 wherein the task sequencing module is further configured to, for each candidate task:
  determine a final task in at least one candidate task sequence; and
  for each candidate task sequence, successively query a data structure to identify for each task, beginning with the final task, the next predecessor task, if any, until an initial predecessor task in the candidate task sequence is reached.

15. The task allocation system of claim 13 wherein the task sequencing module is further configured to, for each candidate task:
  determine a final task in at least one candidate task sequence; and
  successively query a task object for the final task and a task object for each predecessor task in the candidate task sequence to determine the next predecessor task, if any, until an initial predecessor task in the candidate task sequence is reached.

16. The task allocation system of claim 13 wherein the task allocation module is further configured to:
  receive one or more constraints related to the objective; and
  generate the task allocation tree based on the candidate task sequences and the received constraints.

17. The task allocation system of claim 13 wherein the task allocation module is further configured to:
  calculate costs associated with one or more of the child nodes in the task allocation tree; and
  search the task allocation tree for a lowest cost plan.

18. The task allocation system of claim 17 wherein the task allocation module is further configured to perform a branch and bound search of the task allocation tree to find the lowest cost plan.

19. The task allocation system of claim 17 wherein the task allocation module is further configured to compute an initial cost estimate for one or more of the child nodes in the task allocation tree based on a heuristic calculation to reduce processing time.

20. The task allocation system of claim 13 wherein the task allocation module is further configured to determine an intermediate objective that is performed prior to completion of the task allocation plan.

* * * * *